(12) United States Patent
Oyman et al.

(10) Patent No.: US 8,422,940 B2
(45) Date of Patent: *Apr. 16, 2013

(54) RESOURCE MANAGEMENT AND INTERFERENCE MITIGATION TECHNIQUES FOR RELAY-BASED WIRELESS NETWORKS

(75) Inventors: Ozgur Oyman, Palo Alto, CA (US); Qinghua Li, Sunnyvale, CA (US); Nageen Himayat, Fremont, CA (US); Jaroslaw J. Sydir, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 26 days.

This patent is subject to a terminal disclaimer.

(21) Appl. No.: 13/105,222

(22) Filed: May 11, 2011

(65) Prior Publication Data

US 2011/0211618 A1    Sep. 1, 2011

Related U.S. Application Data

(63) Continuation of application No. 12/049,207, filed on Mar. 14, 2008, now Pat. No. 7,962,091.

(51) Int. Cl.
| | | |
|---|---|---|
| H04B 7/00 | (2006.01) |
| H04B 3/36 | (2006.01) |
| H04B 7/14 | (2006.01) |
| H03C 7/02 | (2006.01) |
| H04W 4/00 | (2009.01) |
| G01R 31/08 | (2006.01) |
| G06F 11/00 | (2006.01) |
| G08C 15/00 | (2006.01) |
| H04J 1/16 | (2006.01) |
| H04J 11/00 | (2006.01) |
| H04J 3/14 | (2006.01) |
| H04J 3/16 | (2006.01) |
| H04J 3/22 | (2006.01) |
| H04L 1/00 | (2006.01) |
| H04L 12/26 | (2006.01) |

(52) U.S. Cl.
USPC ............... 455/7; 455/500; 455/101; 455/522; 370/330; 370/329; 370/238; 370/208; 370/468; 375/260; 375/267; 375/299; 375/130

(58) Field of Classification Search .................. 370/330, 370/329, 238, 208, 468; 375/260, 267, 299, 375/130; 455/7, 500, 101, 522
See application file for complete search history.

(56) References Cited

U.S. PATENT DOCUMENTS 6,549,784 B1    4/2003 Kostic et al.
7,760,678 B2    7/2010 Sandhu et al.
(Continued)

FOREIGN PATENT DOCUMENTS

| GB | 2427792 A | 1/2007 |
| WO | 2006/034578 A1 | 4/2006 |
| WO | 2006/088400 A1 | 8/2006 |

OTHER PUBLICATIONS

Sendonaris, E. et al. "Increasing uplink capacity via user cooperation diversity," In Proceedings of IEEE International Symposium on Information Theory, Cambridge, MA, Aug. 1998, pp. 156.

(Continued)

*Primary Examiner* — Bobbak Safaipour
(74) *Attorney, Agent, or Firm* — Schwabe, Williamson & Wyatt, P.C.

(57) ABSTRACT

Embodiments of a system and methods for resource management and interference mitigation techniques for relay-based networks are generally described herein. Other embodiments may be described and claimed.

8 Claims, 9 Drawing Sheets

U.S. PATENT DOCUMENTS

| | | | |
|---|---|---|---|
| 2007/0086512 A1 | 4/2007 | Can et al. | |
| 2007/0147255 A1* | 6/2007 | Oyman | 370/238 |
| 2007/0211757 A1* | 9/2007 | Oyman | 370/468 |
| 2008/0014884 A1* | 1/2008 | Oyman et al. | 455/187.1 |
| 2008/0080436 A1 | 4/2008 | Sandhu et al. | |
| 2008/0096571 A1* | 4/2008 | Pedersen et al. | 455/450 |
| 2008/0155148 A1 | 6/2008 | Oyman | |
| 2008/0176577 A1* | 7/2008 | Bourlas et al. | 455/454 |
| 2008/0212526 A1 | 9/2008 | Oyman | |
| 2008/0227397 A1* | 9/2008 | Prasad et al. | 455/63.1 |
| 2009/0109892 A1 | 4/2009 | Oyman et al. | |
| 2009/0170497 A1 | 7/2009 | Miao et al. | |
| 2009/0170522 A1* | 7/2009 | Tirkkonen et al. | 455/452.1 |
| 2009/0245197 A1* | 10/2009 | Ma et al. | 370/330 |
| 2010/0027502 A1* | 2/2010 | Chen et al. | 370/330 |
| 2010/0074347 A1* | 3/2010 | Lomnitz et al. | 375/260 |
| 2010/0166087 A1* | 7/2010 | Lomnitz | 375/260 |

OTHER PUBLICATIONS

European Search Report received for European Patent Application No. 09155151.5, mailed on Jul. 14, 2009, 9 Pages.

Office Action received for European Patent Application No. 09155151.5, mailed on Mar. 4, 2010, 1 page of Office Action.

Office Action received for Chinese Patent Application No. 200910159507.0, mailed on Aug. 2, 2011, 4 pages of Chinese Office Action and 6 pages of English translation.

Office Action Received in European Patent Application No. EP12157973.4, mailed Apr. 5, 2012, 4 pages.

Office Action Received in Chinese Patent Application No. 200910159507.0, mailed Jun. 1, 2012, 8 pages of Office Action, including 5 pages of English Translation.

* cited by examiner

RESOURCE MANAGEMENT AND INTERFERENCE MITIGATION TECHNIQUES FOR RELAY-BASED WIRELESS NETWORKS

REFERENCE TO RELATED INVENTIONS

The present non-provisional application claims priority to U.S. Non-Provisional patent application Ser. No. 12/049,207 filed Mar. 14, 2008, entitled "Resource Management and Interference Mitigation Techniques for Relay-Based Wireless Networks."

FIELD OF THE INVENTION

This application relates to relay-based wireless cellular systems and, more particularly, to resource management and mitigation of co-channel interference in a relay-assisted wireless network.

BACKGROUND

The performance of wireless cellular systems is significantly limited due to co-channel interference from neighboring base stations, especially as these systems move towards aggressive frequency reuse scenarios. While the overall spectral efficiency of the cellular system may improve with aggressive frequency reuse, the performance of cell-edge users degrades substantially. A variety of interference management techniques are applied to enhance performance of cell-edge users, ranging from the design of fractional frequency reuse (FFR) mechanisms for cell-edge users, to coordinated transmit beam-forming techniques, to receiver interference cancellation using multiple antennas.

BRIEF DESCRIPTION OF THE DRAWINGS

The present invention is illustrated by way of example and not as a limitation in the figures of the accompanying drawings, in which.

DETAILED DESCRIPTION

Figure 1:
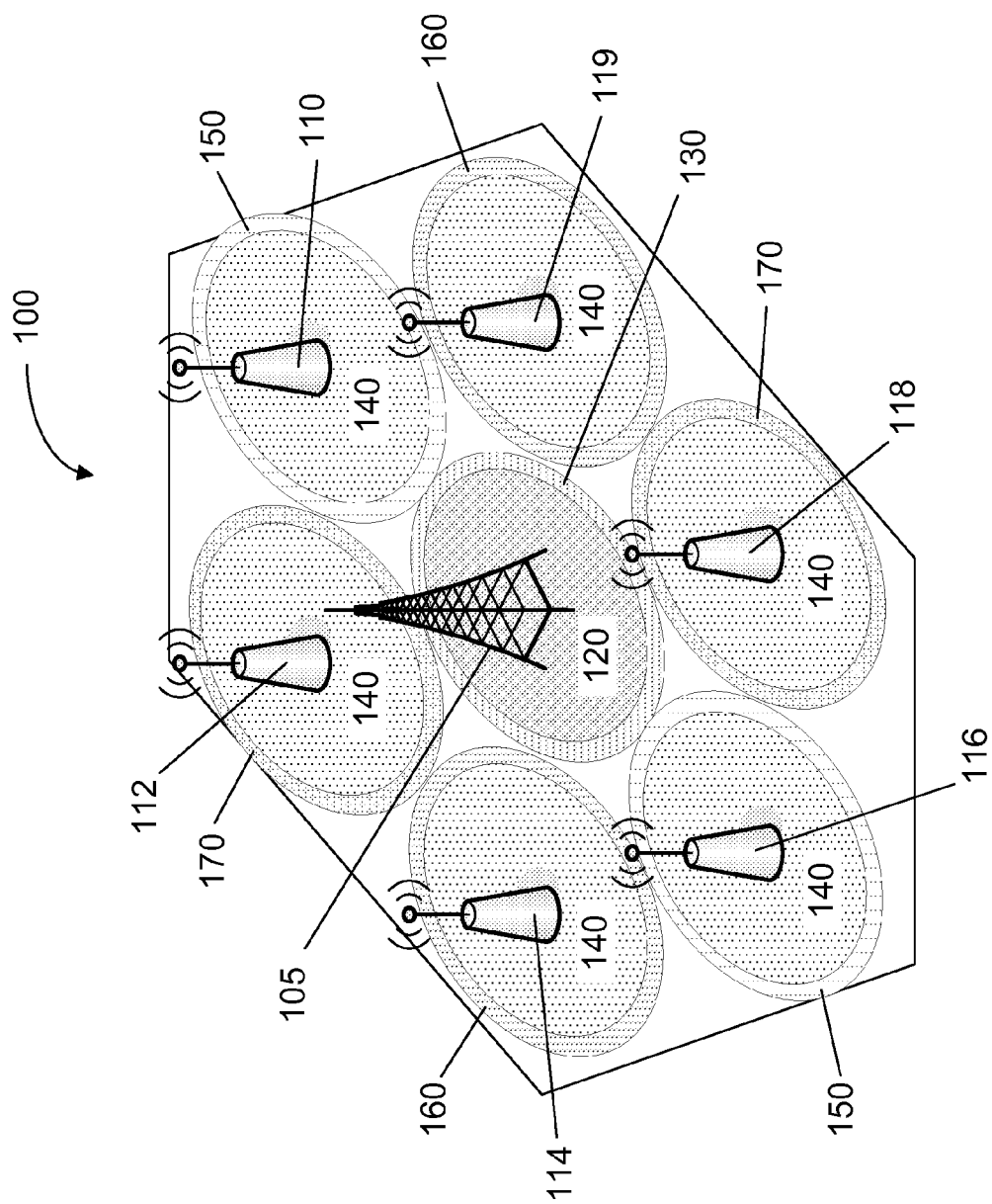
FIG. 1 is a diagram of a relay-based fractional frequency reuse cell, according to some embodiments.

Embodiments of methods and systems for providing interference mitigation and resource management in a relay-based wireless cellular network are described herein. In the following description, numerous specific details are set forth such as a description of a combined use of cooperative relay communications, relay-based fractional frequency reuse, and relay-based probabilistic interference mitigation to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

A limitation to performance in wireless networks is poor reliability and coverage caused by random fluctuations due to fading in wireless channels. Cooperative downlink communication techniques in a relay-based cellular wireless network allow multiple relay stations and possibly a base station to jointly transmit information to multiple users, allowing the extraction of multiple-input multiple-output (MIMO) benefits in a distributed fashion, including gains of cooperative diversity, cooperative multiplexing and distributed array (i.e., power efficiency). This makes cooperative relay communication an ideal technique for throughput, coverage and reliability enhancement in cellular wireless networks.

It would be an advance in the art to increase throughput, capacity, and coverage improvements in a wireless network, particularly for users located at or near boundary regions of sectors, or cell edges, formed as a result of base transceiver station and/or relay station antenna configuration and orientation and consequently suffering poor performance due to low signal-to-interference-and-noise ratio conditions. In the downlink mode, performance improvements for these cell-edge users may be enabled by using cooperative transmission techniques whereby multiple relay stations and possibly the base station interact jointly to share their antennas to extract MIMO benefits in the form of cooperative diversity, cooperative multiplexing and distributed array gains. Alternatively, fractional frequency reuse may be employed in both downlink and uplink modes, to provide wireless network improvements by reducing cell-edge interference caused by repeated use of a given frequency in a number overlapping communication channels. Further, wireless network improvements may be provided by randomizing transmissions to cell-edge users by carefully controlling the probability of transmission to the cell-edge users as a way to reduce interference in a wireless network. A relay-based fractional frequency reuse policy that can support cooperative transmissions using probabilistic interference mitigation techniques among multiple infrastructure terminals, such as base transceiver stations and relay stations, may provide for improved wireless network performance. Relay and access links may be separated in frequency as well as in time. Consequently, users in a wireless network may enjoy the combined benefits of interference mitigation, cooperative diversity, and power efficiency.

Now turning to the figures, a diagram of a relay-based fractional frequency reuse cell 100 according to some embodiments is described in FIG. 1. In one embodiment, the relay-based fractional frequency reuse cell 100 with a serving base station 105 is surrounded by six relay stations 110, 112, 114, 116, 118 and 119. In another embodiment, three relay stations may be used, though generally, any number of relay stations may be placed in the relay-based fractional frequency reuse cell 100 at arbitrary locations. The relay stations transmit and receive signals to and from the serving base station 105 and/or to other relay stations and/or to mobile stations to improve the quality of communication to the mobile stations located in areas near the edge of the relay-based fractional frequency reuse cell 100. To provide power savings at the relay stations 110, 112, 114, 116, 118 and 119, and minimize co-channel interference, one consideration of the relay station deployment is such that relay station coverage areas do not overlap.

Depending on a location in the cell 100, a given mobile station (MS) will be associated to the serving base station 105 or one or more of the relay stations 110, 112, 114, 116, 118 and 119. For example, a MS at the center of cell 100 is likely to be directly connected to the serving base station 105 while a MS at an edge of a cell 100 is likely to be connected to one or more relay stations 110, 112, 114, 116, 118 and 119. Further, depending on the MS location, different spectrum reuse policies may be adopted over the radio access links, wherein the radio access link may be between the serving base station 105 and MS or between a relay station 110, 112, 114, 116, 118 and 119 and MS, including (i) spectrum reuse by the serving base station 105 and one of the relay stations 110, 112, 114, 116, 118 and 119, (ii) spectrum reuse by multiple relay stations 110, 112, 114, 116, 118 and 119, and (iii) spectrum reuse by the serving base station 105 and multiple relay stations 110, 112, 114, 116, 118 and 119.

Multi-hop relaying and spectrum reuse techniques allow for throughput, capacity and coverage improvement, but resulting interference due to simultaneous transmissions of the serving base station 105 and relay stations 110, 112, 114, 116, 118 and 119 over radio access links should be managed to avoid performance losses due to severe interference issues. Mobile stations at cell 100 edges may suffer from interference problems. Similarly, users located at edges of the coverage areas of relay stations 110, 112, 114, 116, 118 and 119 may also suffer from similar interference problems, not only caused by co-channel interference from other cells (i.e. all stations outside cell 100), but also intra-cell interference caused by the MSs inside cell 100, i.e., serving base station 105 and/or the relay stations 110, 112, 114, 116, 118 and 119. To address this problem, a reuse factor for a given MS within the cell 100 should not only be adjusted with respect to its geographical location with respect to the serving base station 105, but also its location with respect to the relay stations 110, 112, 114, 116, 118 and 119.

In FIG. 1, the frequency reuse and channel allocation schemes over the relay-based cell 100 are allocated according to frequency channel regions 120, 130, 140, 150, 160 and 170. At the center of the fractional frequency reuse cell 100, the serving base station 105 operates in a first frequency channel 120 region surrounded by a second frequency channel region 130. In this embodiment, the purpose of using a second frequency channel region 130 is to lower frequency reuse in comparison to the first frequency channel region 120 and thereby reduce co-channel interference seen by mobile stations in this region, so that the mobile stations can receive better quality of service in terms of throughput, capacity and coverage. Such kind of frequency reuse at the center of the fractional frequency reuse cell 100 provides improved communications to MSs located near the serving base station 105 by assigning resources among two channels with varying degrees of reuse in the center of the relay-based fractional frequency reuse cell 100.

Relay stations 110 and 116 operate near the cell 100 edge in a third frequency channel 140 region surrounded by a fourth frequency channel 150 region to provide enhanced communications to MSs that may otherwise experience heavy co-channel interference. Relay stations 112 and 118 operating in the third frequency channel 140 region surrounded by a fifth frequency channel 170 region and relay stations 114 and 119 operating in the third frequency channel 140 region surrounded by a sixth frequency channel 160 are similarly configured in this embodiment to provide fractional frequency reuse (FFR) within the cell 100. Relay stations 110, 112, 114, 116, 118 and 119 may use the same frequency channel for the mobile stations located proximate to each relay station to maximize spectral efficiency benefits from frequency reuse. Further, each relay station is also able to use different frequency channels for mobile stations that are at the edges of their respective coverage areas. Thus, the mobile stations in the frequency channel regions 150, 160 and 170 are served with lower frequency reuse in comparison to those mobile stations in the frequency channel region 140. Lowering frequency reuse in these regions of cell 100 reduces co-channel interference seen by mobile stations and thereby enhances throughput, capacity and coverage. On the other hand, full fractional reuse may be applied to the center channel regions corresponding to the third frequency channel 140 immediately adjacent to the relay stations in addition to FFR applied to channel regions located around the perimeter of the center channel regions.

In some embodiments, one or more of the frequency channel regions 150, 160 and 170 may correspond to the same frequency channel, implying more aggressive frequency reuse among relay stations 110, 112, 114, 116, 118 and 119 for users at the edges of their coverage areas. Moreover, in some embodiments, frequency channel regions 120 and 140 may correspond to the same frequency channel, implying more aggressive frequency reuse among serving base station 105 and relay stations 110, 112, 114, 116, 118 and 119 for the users served under high frequency reuse. Finally, in some embodiments, one or more of the frequency channel regions 130, 150, 160 and 170 may correspond to the same frequency channel, implying more aggressive frequency reuse among base station 105 and relay stations 110, 112, 114, 116, 118 and 119 for the users served under lower frequency reuse.

In some embodiments, a MS situated at a cell 100 edge would be served under frequency reuse of three with three orthogonal bands (or sets of sub-channels) allocated to pairs of relay stations each located on opposite sides of the cell 100 to avoid co-channel interference, i.e., as depicted in FIG. 1, the frequency channel regions 150, 160 and 170 would then correspond to three separate frequency bands. In an alternate embodiment, a reuse pattern of two may be applied to provide two sub-channels to each of three relay stations in an alternating pattern. In a further embodiment, a reuse pattern of six may be used to provide each relay station with its own frequency channel, requiring a total of six orthogonal channel allocations.

In the embodiment shown in FIG. 1, MSs located very close to the serving base station 105 (within the first frequency channel 120) are served under a reuse 1 policy and the cell 100 edge users located very close to one of the relay stations 110, 112, 114, 116, 118 and 119 (within the third frequency channel 140) are served under a reuse 1 policy. Alternately, a reuse 3 policy is adopted for MSs which are far from the serving base station 105 (within the second frequency channel region 130) and any relay stations 110 and 116 (within the fourth frequency channel 150 region), 112 and 118 (within the fifth frequency channel 170 region), and 114 and 119 (within the sixth frequency channel 160) to ensure that a cost of resulting interference from spectrum reuse is minimized for these MSs.

Figure 2:
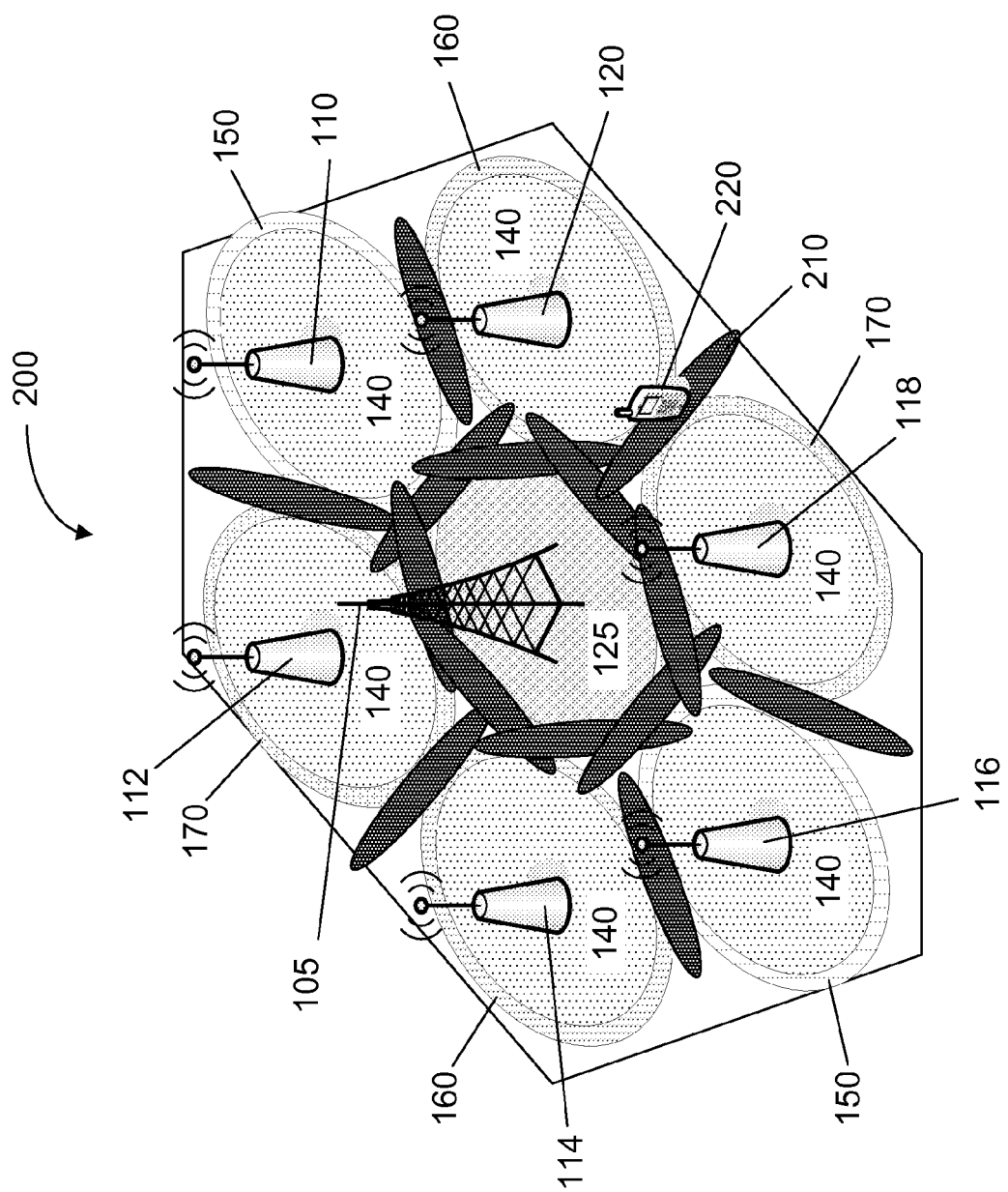
FIG. 2 is a diagram of a cell with cooperative fractional frequency reuse implemented in the cell.

FIG. 2 is a diagram of relay-based fractional frequency reuse cell 100 illustrated in FIG. 1 with cooperative fractional frequency reuse, resulting in a cooperative FFR cell 200. Downlink (DL) cooperative relaying techniques are combined with relay-based FFR concepts with the objective of enabling successful interference management in a cooperative relay mode to benefit MSs in a cellular system located at the cell edge or periphery that normally experience poor SINR conditions. Resultant cooperative diversity and power efficiency gains can lead to a significant performance gain for cell-edge MSs; which is roughly comparable to that provided by receive maximal ratio combining (MRC) techniques.

In the presence of a relay-based FFR policy as shown in FIG. 2, the inclusion of DL cooperative relay support for cell edge MSs implies that MSs in the reuse 3 zones (i.e. within the second frequency channel region 130, the fourth frequency channel 150 region, the sixth frequency channel 160, or the fifth frequency channel 170 region) may be served by multiple infrastructure terminals (serving base station 105 and/or relay stations 110, 112, 114, 116, 118 and 119) through their simultaneous transmissions using cooperative relaying techniques such as distributed space-time coding (STC), distributed beam-forming, cooperative multiplexing, etc.

Cooperative relaying techniques are applied to provide a target node 220 with a poor signal to interference and noise ratio (SINR) with enhanced interference management capabilities in FIG. 2. The resultant cooperative diversity and power efficiency gains lead to a significant increase in performance for the target node 220 (for example a mobile station in the form of a cellular phone, personal digital assistant (PDA), pocket PC, handheld computer device, etc.). Cooperative diversity results from multiple infrastructure terminals (relay stations 110, 112, 114, 116, 118 and 119, serving base station 105, etc.) providing simultaneous or nearly simultaneous transmissions using a cooperative relaying technique such as distributed space-time coding (STC), distributed beam forming, cooperative multiplexing, etc.

A combination of relay-based FFR and DL cooperative diversity enables the target node 220 to simultaneously realize the interference mitigation advantages of FFR and cooperative diversity, along with power efficiency advantages of cooperative relaying, for cooperative FFR cell 200 edge mobile stations is referred to as cooperative FFR (coop-FFR). In one embodiment, the target node 220 operates using cooperative diversity in a downlink (DL) mode in coop-FFR region 210 located in and/or between the fifth frequency channel 170 and sixth frequency channel 160. As a result, the target node 220 may receive an assigned time-frequency resource for reception from relay station 118 while a neighboring relay station 119 will be given the option to transmit on the same time-frequency resource to support DL cooperative relaying.

A difference between coop-FFR and traditional relay-based FFR in the reuse 3 policy mode is that a cooperative FFR cell 200 edge mobile station may receive simultaneous cooperative transmissions on the same time and frequency zone from two or more adjacent infrastructure terminals (relay stations 110, 112, 114, 116, 118 and 119, serving base station 105, etc.) in coop-FFR while this is not allowed using traditional FFR. For example, when a MS, such as the target node 220 is assigned to a particular time-frequency resource for reception from an infrastructure terminal, the neighboring infrastructure terminals will also be given the option to transmit on the same time-frequency resource to support DL cooperative relaying. Therefore, the cooperative FFR cell 200 edge mobile station not only avoids the dominant interference from the adjacent infrastructure terminals, the infrastructure terminals are also used to advantageously realize cooperative diversity and power efficiency gains.

Downlink data is sent by the serving base station 105 and all the relay stations 110, 112, 114, 116, 118 and 119, can receive the DL data and learn the scheduling decisions of the serving base station 105. Furthermore, in the case of orthogonal frequency-division multiple access (OFDMA) based resource allocation in which the serving base station 105 schedules the data intended for different relay stations 110, 112, 114, 116, 118 and 119 orthogonally in a relay zone, each relay station can hear the data and control information (MAPs etc.) of other relay stations. Therefore, the overhead cost of cooperation is expected to be very small in terms of required additional bandwidth to schedule for cooperative relay transmissions. While there may be some additional overhead cost in terms of the control information (e.g. additional MAPs etc.) to schedule and coordinate the DL cooperative relay transmissions, known remedies can be applied to minimize such costs.

Figure 3:
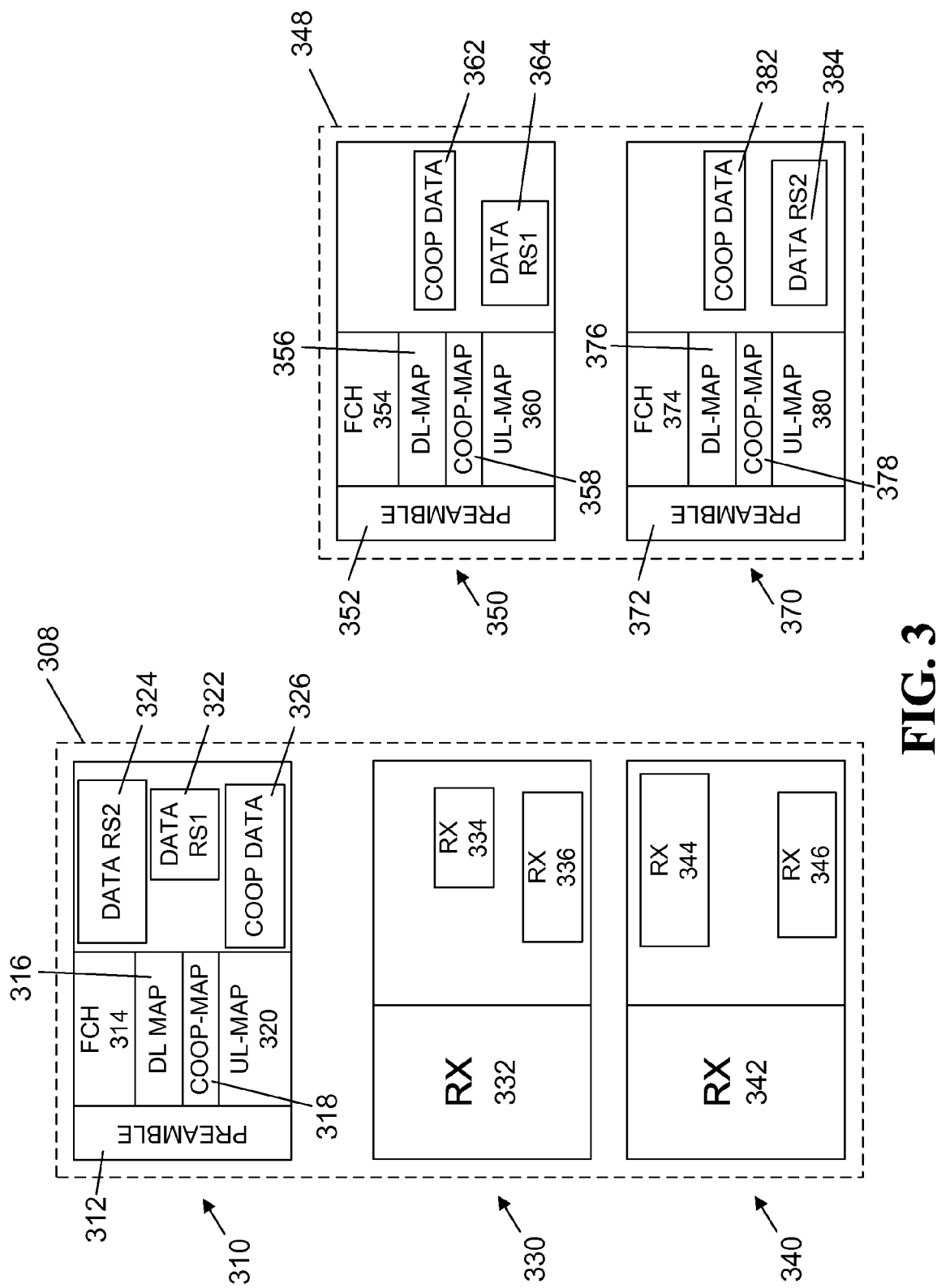
FIG. 3 is a hierarchical scheduling scheme to enable cooperative fractional frequency reuse, according to some embodiments.
Figure 4:
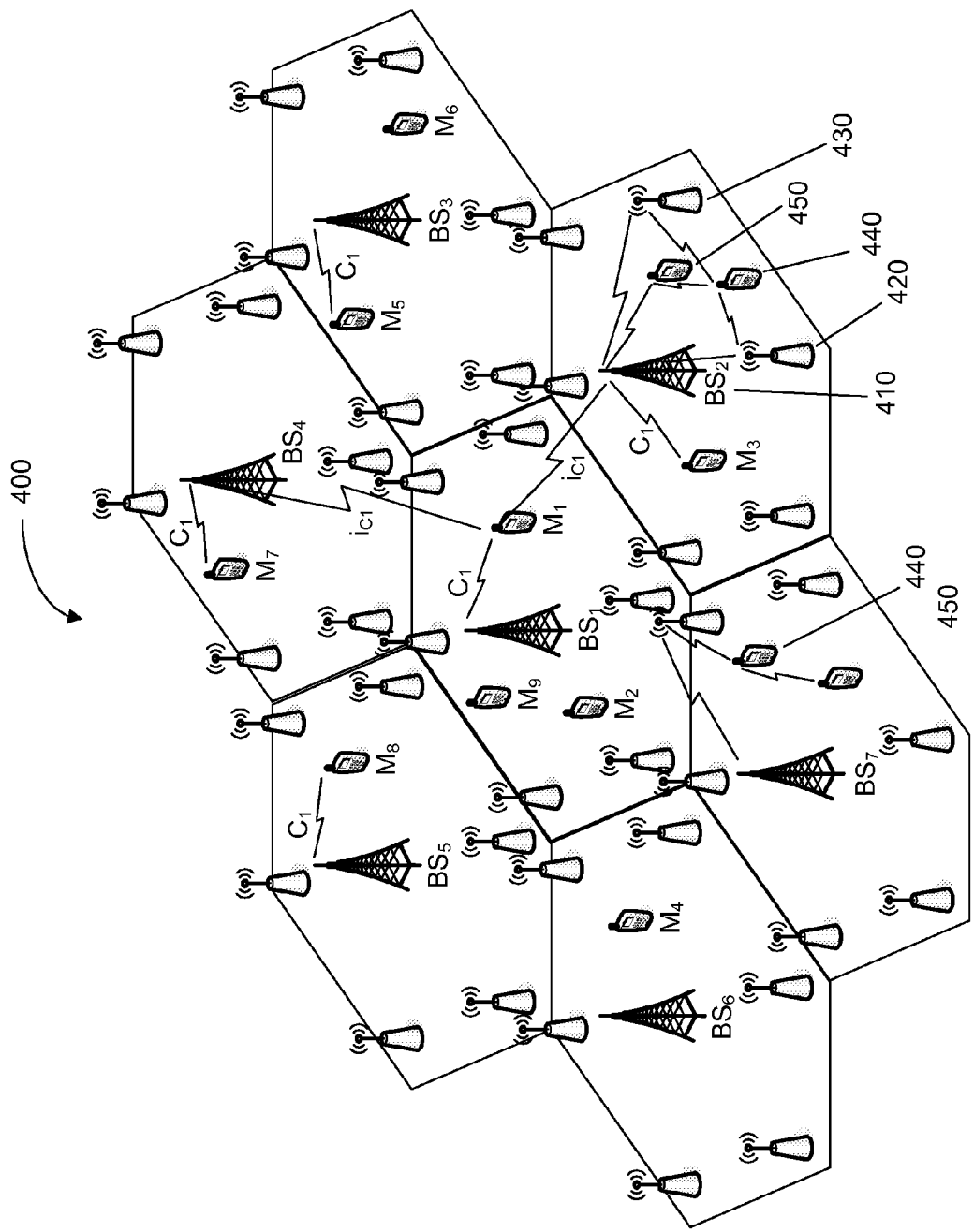
FIG. 4 is a diagram illustrating a relay-based wireless network environment with communication nodes, relay nodes, cooperator nodes, and target nodes.

FIG. 3 is an embodiment of a hierarchical scheduling and resource management scheme to enable cooperative fractional frequency reuse involving a communications transmit node, two relay nodes and a communications receive node. An embodiment of a communications transmit node 410, a first relay node 420, a second relay node 430 and a communications receive node 440, or target node, and cooperator node 450 are illustrated in FIG. 4. The communications transmit node 410 may be the serving base station 105, the communications receive node 440 may be the target node 220 the relay nodes, 420 and 430, may be any two of the relay stations 110, 112, 114, 116, 118 and 119, and the cooperator node 450 or neighbor node may be a mobile station, a subscriber station 560 (FIG. 5), or another base station or relay node. Development of scheduling and resource management techniques for relay-assisted cellular networks is necessary in order to support DL cooperative relaying and advanced relay-based interference management policies. In a cooperative relaying and the coop-FFR scheme, simultaneous transmissions of multiple relay stations 110, 112 114, 116, 118 and 119 or of the serving base station 105 and one or more relay stations 110, 112, 114, 116, 118 and 119 are required to transmit in a coordinated fashion so that they occur in the same time/frequency (TF) and with a coordinated MCS and a chosen cooperative transmission protocol.

While centralized scheduling at the serving base station 105 can accomplish this task, it is not a preferred approach due to complications that arise in ranging, bandwidth request and network entry. Instead, a two-layer hierarchical (or hybrid) scheduling scheme may be used. A first layer is distributed scheduling, which serves mobile stations in a non-cooperative fashion. The second layer is centralized scheduling, which serves a specific set of MSs (such as cooperator node 450) that benefit from cooperative relaying. While the resource allocation for most MSs relies on distributed scheduling, some level of centralized coordination by the base station is possible regarding the scheduling decisions for the MSs that can benefit from DL cooperative relaying. In this context, the relay stations 110, 112, 114, 116, 118 and 119 create their own schedules using distributed scheduling, but the serving base station 105 may create specific allocations for the relay stations 110, 112, 114, 116, 118 and 119 downlink transmissions to enable limited centralized coordination and hierarchical scheduling. Each relay station 110, 112, 114, 116, 118 and 119 is notified about the relevant centralized scheduling decisions of the serving base station 105 so that it can perform its distributed scheduling on the time-frequency resources not assigned by the serving base station 105.

The hybrid scheduling scheme to enable coop-FFR uses a centralized coordination mechanism (at the base station) to classify all users to be served in a relay-assisted fashion into two groups: (i) mobile stations that will be served cooperatively, e.g., those mobile stations that are at relay station cell edges under the reuse 3 allocation and are selected by the base station for cooperative transmission; (ii) mobile stations that will be served non-cooperatively, e.g., 1) those users very close to a particular relay station so that they are under reuse 1 allocation, and 2) those users that are at relay station cell edges under the reuse 3 allocation, but the base station decides that these mobile stations should not be served cooperatively.

This grouping of the users may be performed based on criteria such as user location information, channel quality indicator (CQI) metrics and traffic loads at the base station and relay stations, and may be maintained across multiple frames or changed on a frame-by-frame basis.

The relay stations should also be informed about these decisions so that each relay station knows: (i) which mobile stations it will serve cooperatively and which mobile stations it will serve non-cooperatively, and (ii) which time-frequency (TF) zones have been assigned for cooperative transmissions and which TF zones are to be used for non-cooperative transmissions.

Over the TF zones allocated for non-cooperative transmissions, each relay station may perform distributed scheduling for the set of mobile stations it is instructed to serve non-cooperatively and a base station does not have to help with the specific TF resource assignments for these mobile stations.

Over the TF zones allocated for cooperative transmissions, further centralized coordination by the base station will be necessary to specify the user TF resource assignments, cooperative transmission schemes and MCS choices and this information should be conveyed to the respective relay stations to be inserted into their DL-MAPs. This approach limits the use of centralized scheduling only for the mobile stations that should be served cooperatively and the remaining mobile stations can be served via distributed scheduling.

An example for the hierarchical scheduling scheme to enable the coop-FFR scheme is shown in FIG. 3 for a two-hop relay-assisted DL communication setting. In this figure, the COOP-MAP zone in DL-MAP carries the information about a base station's centralized scheduling decisions regarding the mobile stations served under cooperative relay protocols. In the next DL subframe, the relay stations include COOP-MAP in their own DL-MAPs, but also create their own allocation for mobile stations served under distributed scheduling.

Returning to the figures in FIG. 3, the communications transmit node 410 transmits a data block 310 with a header or preamble 312 and a body containing a fundamental channel (FCH) 314 to provide basic data service to data users, a downlink (DL) map 316, a cooperator map (COOP-MAP) 318 including scheduling and modulation coding scheme information, an uplink map (UL-MAP) 320, relay station 1 data 322, relay station 2 data 324, and cooperator data 326. The preamble 312 contains supplemental data, placed at the beginning of the data block 310, used for frame synchronization and may contain data block 310 handling information. The first relay node 420 of FIG. 4 receives a first relay node data block 330 containing a first relay node data block header 332 and first relay node data packets 334 and 336.

The second relay node 430 of FIG. 4 receives a second relay node data block 340 containing a first relay node data block header 342 and first relay node data packets 344 and 346. The data block 310 is transmitted and the first relay node data block 330 and the second relay node data block 340 are received in a first DL sub-frame 308.

In a second DL sub-frame 348, the first relay node 420 transmits to the communications receive node 440 (target node or subscriber station), a first relay node data block 350 with a first relay node preamble 352, first relay node fundamental channel 354, first relay node DL MAP 356, first relay node COOP-MAP 358, first relay node UL-MAP 360, first relay node COOP-DATA 362, and relay station 1 data 364. Similarly, in the second DL sub-frame 348, the second relay node 430 transmits communications receive node 440, a second relay node data block 370 with a second relay node preamble 372, second relay node fundamental channel 374, second relay node DL MAP 376, second relay node COOP-MAP 378, second relay node UL-MAP 380, second relay node COOP-DATA 382, and relay station 2 data 384. The COOP-MAP 358 and COOP-DATA 362 from the first relay node 420 and the COOP-MAP 378 and COOP-DATA 382 from the second relay node 430 allow a communications receive node 440 (as well as other mobile stations that are served cooperatively in the same region) to communicate using cooperative fractional frequency reuse. In some embodiments, only one relay station may transmit the whole COOP MAP to the mobile stations that are served cooperatively in the same region, while both relay stations would transmit COOP-DATA.

The discussed hierarchical scheduling and resource management technique could be also be applied to general relay-based cellular networks to support transmission techniques other than cooperative relaying, such as successive interference cancellation techniques, which also requires centralized coordination by a base station. As before, distributed scheduling can be performed for the users which will not be served by any advanced cooperative relay or advanced interference management techniques.

The communications receive node 440 may communicate using according to cellular-based communications using an appropriate cellular standard such as a general packet radio system (GPRS), enhanced data rates for global evolution (EDGE), or third-generation wireless (3G), though the embodiment is not so limited. In other embodiments, other wireless communication standards may be employed, such as but not limited to communications defined by the Institute of Electrical Institute of Electrical and Electronic Engineers (IEEE) 802.11, Wireless Fidelity (Wi-Fi) and IEEE 802.16 Worldwide Interoperability for Microwave Access (WiMAX) suites of standards.

In a relay-assisted cellular network, interference management becomes more complex since there are multiple sources of interference. For instance in the DL mode, the interference observed by a mobile station may be due to (i) co-channel interference from other base stations, (ii) co-channel interference from the relay stations in neighboring base station cells and (iii) intra-cell interference from other infrastructure terminals (base station and/or relay stations). The plurality of sources causing interference makes it difficult to mitigate interference in a coordinated fashion since a huge amount of coordination would be needed to simultaneously avoid interference and use TF resources in an efficient manner. In addition, the design of interference mitigation approaches using techniques such as MIMO multi-user detection (MUD) and/or successive interference cancellation (SIC) techniques is also more difficult since the number of antenna degrees of freedom (in MIMO-MUD) and IC-cancellation layers (in SIC) required to track/mitigate possible interferers is large. Moreover, techniques such as cooperative relaying involve simultaneous transmissions by multiple infrastructure terminals in a given TF resource, increasing the potential interference to other transmissions at the same TF. Under such difficulties encountered with interference mitigation approaches based on coordinated transmissions, a use of randomized transmissions and probabilistic interference mitigation techniques may be used in conjunction with the coop-FFR scheme.

In one example, the MS identifies the base-stations and relay stations causing the most interference to transmissions on its link to the desired base-station or relay stations. This information along with other parameters (e.g. channel quality indicators, interference measurements, number of dominant interferers etc.) is reported by the mobile station to its relay station or base station and in case of a relay station, the relay station relays the information to the base station. The base station shares the identity of the base stations and relay stations causing the most interference, or interference beyond a given channel threshold, along with other relevant parameters with other base stations, which in return may inform their respective relay stations about this information. At the end of this coordination period, each base station and relay station knows the links on which it needs to randomize transmissions and what probabilistic decision making criteria should be considered for various actions. The set of links to be randomized are controlled by a probabilistic interference mitigation medium access control (PIM-MAC). The probabilistic decision making criteria for various actions may be based on average SINR conditions, determined by system geometry and location of mobile stations, as well as quality of service (QoS) demands, traffic conditions and user priorities and therefore require only periodic updates and coordination amongst base-stations and relay stations. Different probabilistic decision making criteria may be designed for different actions such as routing, cooperative relaying and link adaptation.

Each base station and relay station determines actions to be chosen per PIM-MAC link, based on various observed system and channel parameters and pre-determined quality thresholds; using the developed probabilistic decision making criteria.

Probabilistic interference mitigation in a relay-based cellular network leads to the following methods: i) Probabilistic relaying and routing: A relay station that causes too much interference to a neighboring base station cell or relay station cell may not be selected for routing by a base station scheduler, even though the employed routing algorithm may indicate that the multi-hop route through this particular relay station yields the best end-to-end link quality.

ii) Probabilistic cooperation and mode selection: A relay station with favorable channel qualities to assist another relay station for purposes of DL cooperative relay transmission to a mobile station may not be scheduled by the base station with a certain probability since the base station learns that this relay station causes too much interference to a neighboring base station cell or relay station cell. Similarly, the determination of which cooperative relay mode should be used or whether cooperation should not be employed is performed in a random fashion with pre-determined probabilities assigned to each mode. Apart from the selection of the cooperative relay modes, the probabilistic mode selection may also be applied toward (i) relay-based FFR, i.e. for determining the reuse factor (e.g. reuse 1 vs. reuse 3) to be used in various zones of the relay station cells, and (ii) deciding whether advanced interference mitigation techniques should be used in various zones in the base station cell and relay station cells.

In one embodiment, a system for mitigating interference in a wireless communications network comprises a communications node configured to communicate with a target node at a first frequency band and time slot through a multi-hop route comprising a cooperator node, a relay node configured to communicate with the target node, the relay node operating at a second frequency band and time slot, and a medium access controller configured to randomize a plurality of transmission from the communications node for co-channel interference avoidance, based at least on a channel threshold value.

Figure 5:
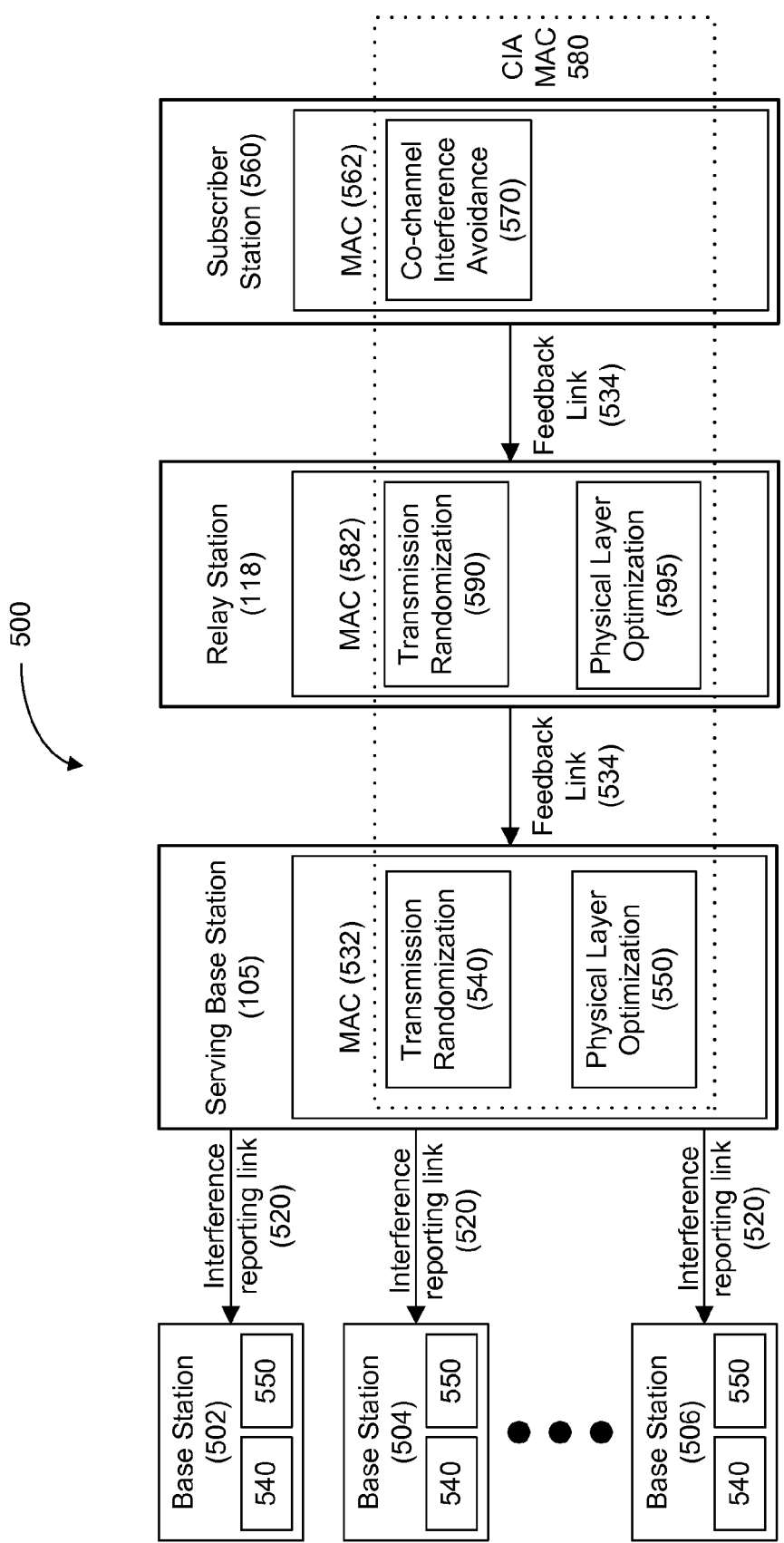
FIG. 5 is a block diagram of an interference mitigation system, according to some embodiments.

An interference mitigation system 500 is depicted in FIG. 5 according to some embodiments. The interference mitigation system 500 includes a serving base station 105, a relay station 118 and a subscriber station 560. The serving base station 105 and the serving relay station 118 are typically selected by the subscriber station 560, based on the relative strengths of the signals received by the subscriber station 560 from serving base station 105 and/or relay station 118. The interference mitigation system 500 may include one or more other base stations, denoted as base station 502, base station 504, and base station 506. The serving base station 105 has a medium access controller (MAC) 532, the relay station 118 has a MAC 582, and the subscriber station 560 has a MAC 562. The MACs 532, 582 and 562 include functional and structural components not described herein, which are well-known to those of ordinary skill in the art. These functional and structural components, which are common to all base stations in the wireless region, are known herein as legacy MAC operations.

In some embodiments, the MACs 532, 582 and 562 each include novel components suitable for co-channel interference avoidance (CIA), known as the CIA MAC 580. Because the MACs 532, 582 and 562 continue to support other MAC functions not described herein, all of the serving base station 105, the relay station 118 and the subscriber station 560 have both legacy MAC and CIA MAC 580 functionality.

The CIA MAC 580 includes co-channel interference avoidance 570, transmission randomization 540, transmission randomization 590, physical layer optimization 550 and physical layer optimization 595, in some embodiments. As shown in FIG. 5, co-channel interference avoidance 570 is performed by the subscriber station 560 while transmission randomization 590 and physical layer optimization 595 are performed by the relay station 118 and transmission randomization 540 and physical layer optimization 550 are performed by the base stations 502, 504, 506 and 105.

Figure 6:
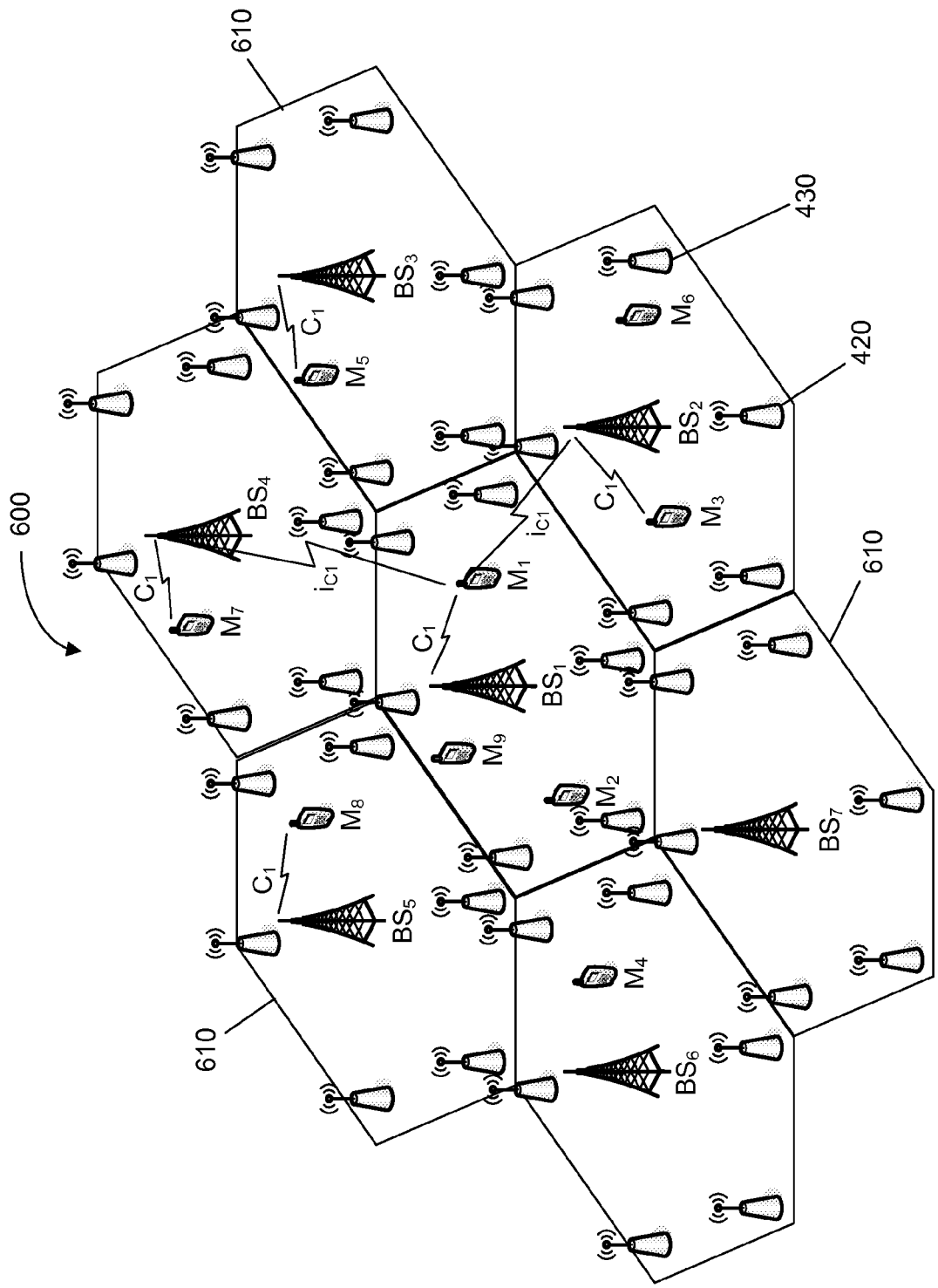
FIG. 6 is a diagram of a wireless neighborhood using the interference mitigation system of FIG. 2, according to some embodiments.

A wireless neighborhood 600 is depicted in FIG. 6, to facilitate understanding the interference mitigations system 500 of FIG. 5, according to some embodiments. The wireless neighborhood 600 includes seven cells 610, each of which has a base station, $BS_1$-$BS_7$ (collectively, base stations BS). Subscriber stations 560, depicted as mobile devices, denoted $M_1$, $M_2$, ... $M_9$, are employed throughout the wireless neighborhood 600 (collectively, subscribers M). The number of subscribers M may vary over time. Lines $c_1$ show the desired links between mobile subscribers M and base stations BS. For mobile subscriber $M_1$, there exists a desired link, $c_1$, to the base station, $BS_1$. Because the base stations are transmitting on channel 1 ($c_1$) using the same frequency, such transmission may cause interference to mobile stations in other cells. For example, in FIG. 6, interferences on the same channel are occurring from base stations, $BS_4$ and $BS_2$, indicated as $i_{c1}$ in both cases.

The interference mitigation system 500 commences with the subscriber station 560 (or target node). The subscriber station 560 notifies the serving base station 105 and the relay station 118 of interference from some other base station or relay station in the wireless neighborhood 600. In FIG. 5, a feedback link 534 is shown pointing from the subscriber station 560 to the serving base station 105 to indicate this step. Then, the serving base station 105 shares the interference report(s) with the other base stations in the wireless neighborhood 600 that there has been a report of interference.

Interference reporting links 520 are shown in FIG. 5 between the serving base station 105 and each of the base stations 502, 504, and 506 in the interference mitigation system 500. Once all base stations in the wireless neighborhood 600 are aware of the interference, the base stations determine whether to perform transmission randomization 540, in some embodiments. Like other transmissions, randomized transmissions occur according to parameters obtained through physical layer optimization 550. Moreover, the relay station 118 determines whether to perform transmission randomization 590, in some embodiments. Like other transmissions, randomized transmissions occur according to parameters obtained through physical layer optimization 595.

Figure 7:
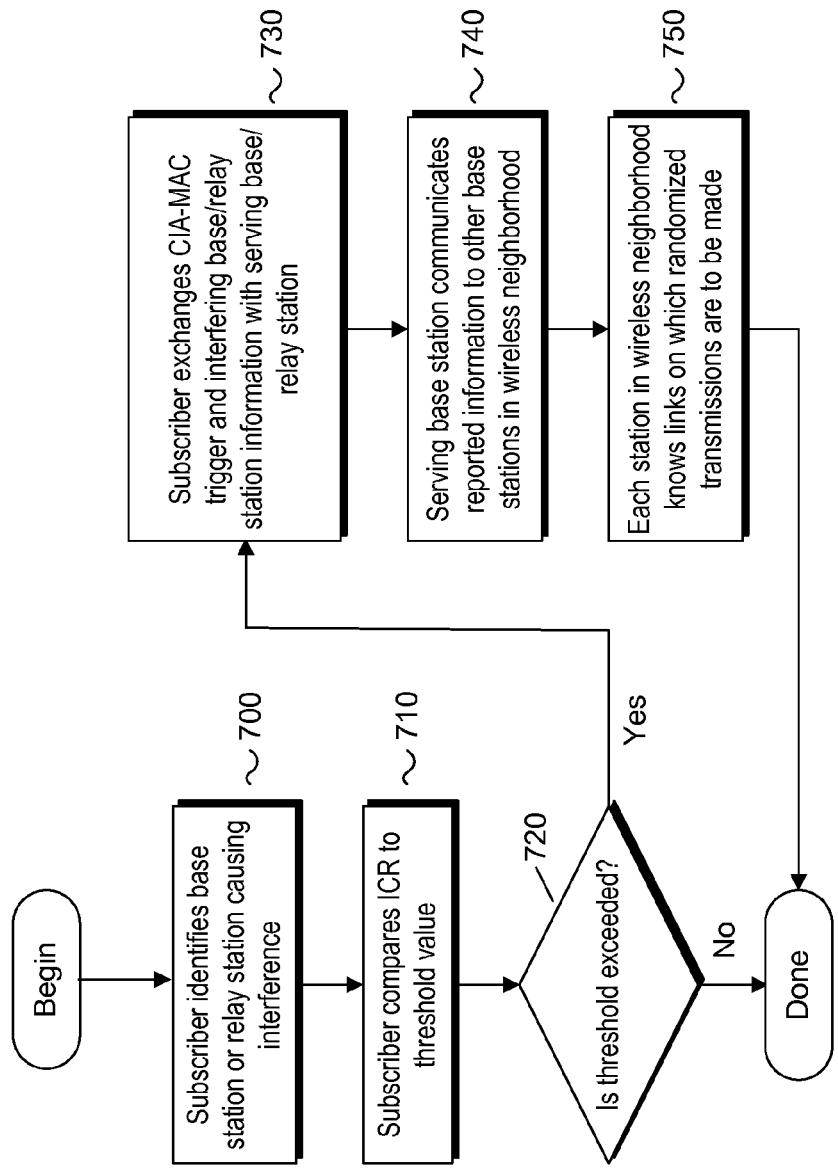
FIG. 7 is a flow diagram showing the co-channel interference avoidance of the interference mitigation system of FIG. 2, according to some embodiments.

Co-channel interference avoidance 570 operates according to the flow diagram of FIG. 7, in some embodiments. The operations are performed by the subscriber station 560 (or one of the subscribers M in the wireless neighborhood 600), although the operations may be performed simultaneously by multiple subscribers. The subscriber station 560 identifies the base station 502 (or relay stations) causing the most interference to transmissions on its link to the serving base-station (block 700). The subscriber station 560 then makes a determination whether to notify its serving base station 105 and possibly its relay station 118 of the interference by comparing the interference-to-carrier ratios (ICR) to a threshold (Γ) (block 710).

If the threshold is not exceeded (block 720), the interference is not sufficient to trigger the notification by the subscriber station 560. Otherwise, the subscriber station 560 submits the identity of the base-station(s) and relay station(s) causing the most interference to its serving base station 105 and possibly its relay station 118 (block 730). In some embodiments, the submission operation constitutes one or more exchanges of the CIA MAC trigger information between the subscriber station 560, the serving base station 105 and the relay station 118. As used herein "CIA MAC trigger" means events that lead the subscriber station 560 or the serving base station 105 or the relay station 118 to invoke the CIA MAC 580 of their respective MACs 562, 582, 532. In other words, the CIA MAC trigger is when the subscriber station 560 determines that the interference exceeds the threshold.

The serving base station 105 communicates the information reported by the subscriber station 560 to other base stations in the wireless neighborhood 600 (block 740). At this point, each base station knows the links in which interference has been reported, which are the links in which transmissions may optimally be randomized (block 750). In some embodiments, the CIA MAC trigger may be based on average SINR conditions, determined by system geometry and location of subscribers. In these embodiments, the CIA MAC trigger is updated and coordinated among other base stations in the wireless neighborhood periodically.

Figure 8:
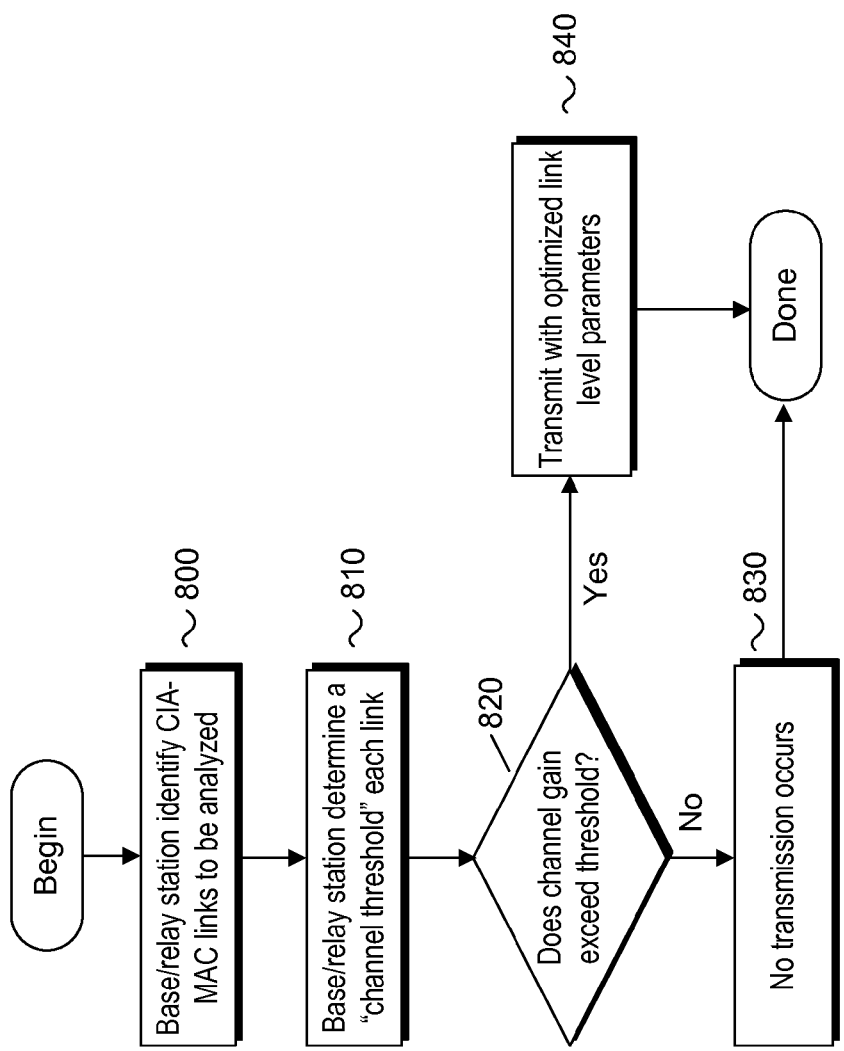
FIG. 8 is a flow diagram of the transmission randomization of the interference mitigation system of FIG. 2, according to some embodiments.

Once the CIA MAC 580 is triggered, the transmission randomization 540 of the MAC 532 in the serving base station 105 and the transmission randomization 590 of the MAC 582 in the serving relay station 118 are initiated. The other base stations and relay stations in the wireless neighborhood likewise initiate transmission randomization to the subscriber station 560. FIG. 8 is a flow diagram showing operations performed to randomize transmissions in the wireless neighborhood 600, according to some embodiments. The operations in FIG. 8 may be performed by all base stations BS and all relay stations in the wireless neighborhood 600, but, for simplification, only one base station and one relay station are indicated in the flow diagram.

The base station and relay station identify the links to be analyzed (block 800), which are the links between the serving base station 105, the relay station 118 and the subscriber station 560 that reported the interference. The base station and relay station determine channel thresholds for the CIA MAC links (block 810). If the channel gain on a given link does not exceed a "channel threshold" (block 820), no transmission to the subscriber station 560 occurs (block 830). Otherwise, the serving base station 105 and the serving relay station 118 transmit to the subscriber station 560 with optimized physical layer parameters (block 840). Hence, in some embodiments, the transmission probability is proportional to the probability of exceeding the "channel threshold".

Before the transmission randomizations 540, 590 and physical layer optimizations 550, 595 can take place, however, the interference mitigation system 500 determines the threshold for the CIA MAC trigger. In some embodiments, each subscriber station 560 makes a decision to trigger the CIA MAC 580. This trigger is based on comparing the measured interference-to-carrier ratio (ICR) from each base-station to a threshold. In some embodiments the threshold is derived based on the assumption of one strong interferer per subscriber. The extension to multiple interferers is straightforward. In some embodiments, where there is a single interferer, the optimal threshold is derived by comparing the good-put of a system using the CIA MAC 580 with that of a system having no CIA MAC. For the optimal threshold, the good-put of CIA MAC is greater than the good-put of a traditional MAC. The values of the ICR thresholds are calculated as a function of the SNR.

The interference mitigation system 500 may employ alternate methods for triggering the CIA MAC 580. These include but are not limited to comparing good-put based on more than one strong interferer, using location-based information or cooperation between subscriber stations 560 to determine severely interfered users, etc. Interference may further be avoided through implementation of fractional frequency reuse, described earlier.

Figure 9:
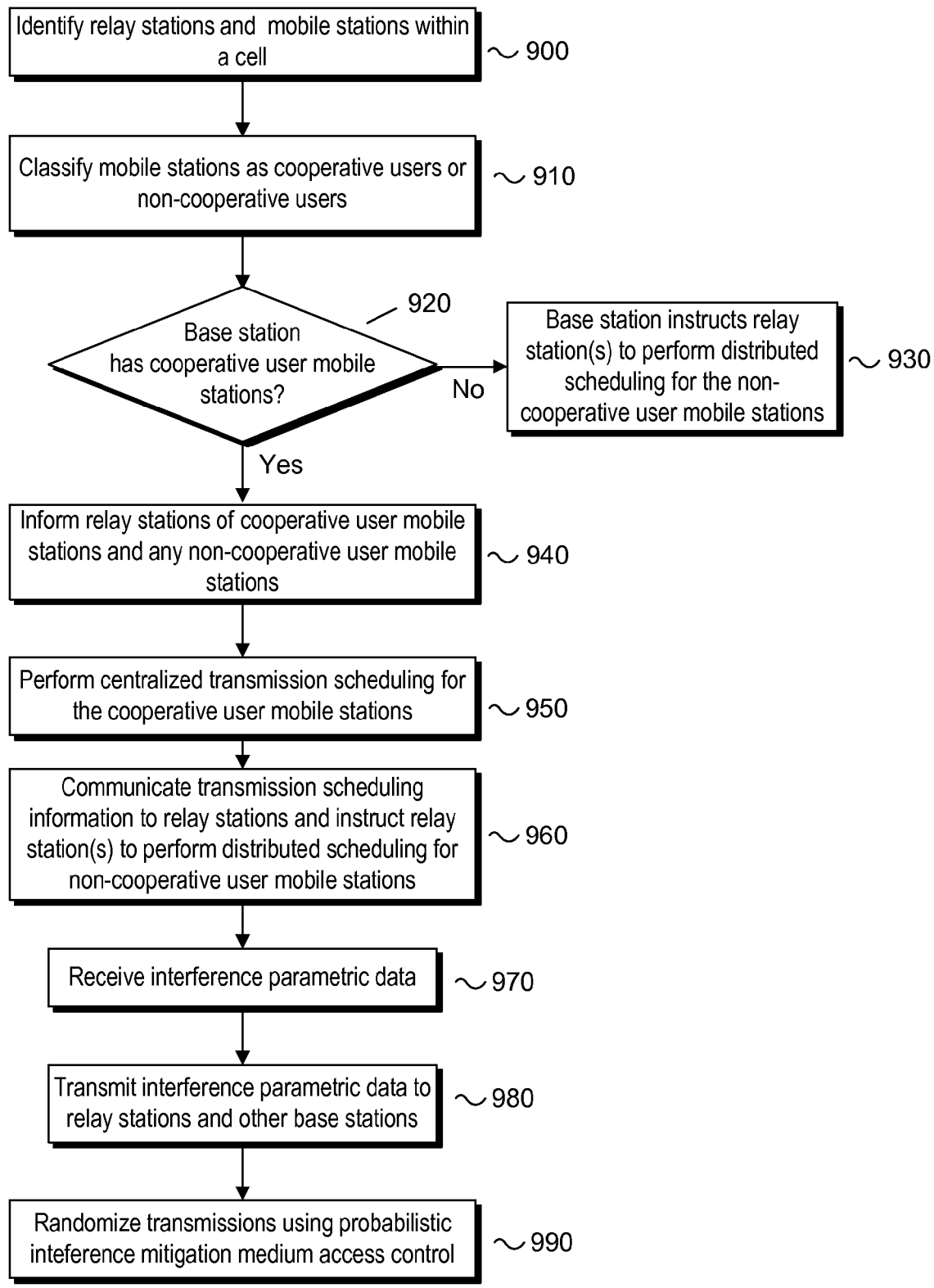
FIG. 9 is a flowchart of a method for providing resource management and interference mitigation in a relay-based wireless network environment.

FIG. 9 is a flowchart of a method for providing resource management and interference mitigation in a relay-based wireless network environment. In element 900, a serving base station 105 identifies one or more relay stations, such as relay station 110, and one or more mobile stations or subscriber stations including a target node 220 in a coverage zone illustrated in FIG. 1 as cell 100. The identified mobile stations are classified as cooperative users or as non-cooperative users in element 910. The serving base station 105 determines whether each relay station has cooperative user mobile stations in element 920. If the serving base station 105 does not have cooperative user mobile stations, the serving base station 105 instructs one or more relay stations to perform distributed scheduling for the non-cooperative user mobile stations (element 930). If the serving base station 105 does have cooperative user mobile stations, the serving base station 105 informs the one or more relay stations of the cooperative user mobile stations and any non-cooperative user mobile stations (element 940). The serving base station 105 then performs centralized transmission scheduling for the cooperative user mobile stations (element 950) and communicates transmission scheduling information to the one or more relay stations and instructs one or more relay stations to perform distributed scheduling for the non-cooperative user mobile stations (element 960). The serving base station 105 receives interference parametric data (element 970) and transmits the interference parametric data to the one or more relay stations and neighboring base stations (element 980). Serving base station and relay station transmissions with a target node 220 are randomized using probabilistic interference mitigation medium access control in element 990.

The above description of illustrated embodiments of the invention, including what is described in the Abstract, is not intended to be exhaustive or to limit the invention to the precise forms disclosed. Embodiments of the invention propose techniques for resource management and interference mitigation in relay-based cellular networks. The proposed algorithms and architectures enable resource management techniques such as hierarchical scheduling and advanced interference mitigation techniques such as fractional frequency reuse (FFR) and probabilistic interference mitigation to work in conjunction with relay protocols (e.g., cooperative relaying) and therefore allow realizing the performance advantages from all of these techniques simultaneously.

While specific embodiments of, and examples for, the invention are described herein for illustrative purposes, various equivalent modifications are possible within the scope of the invention, as those skilled in the relevant art will recognize. In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Thus, embodiments of this invention may be used as or to support a software program executed upon some form of processing core (such as a processor of a computer) or otherwise implemented or realized upon or within a machine-readable medium. A machine-readable medium includes any mechanism for storing information in a form readable by a machine (e.g., a computer). For example, a machine-readable medium can include such as a read only memory (ROM); a random access memory (RAM); a magnetic disk storage media; an optical storage media; and a flash memory device, etc.

Modifications may be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A base station configured to communicate with a plurality of mobile stations and a plurality of relay nodes, wherein one or more of the plurality of mobile stations comprise a first group to be served cooperatively using centralized scheduling through a first relay node of the plurality of relay nodes and one or more of the plurality of mobile stations comprise a second group to be served non-cooperatively through a second relay node of the plurality of relay nodes using distributed scheduling, wherein the second group of mobile stations is to be served using a frequency reuse that is greater than one, the base station comprising a scheduler to schedule time-frequency resources for the first group of mobile stations and wherein the base station is configured to notify the one or more relay nodes to perform distributed scheduling for the second group of mobile stations using time-frequency resources not assigned to the first group of mobile stations and wherein the second relay node of the plurality of relay nodes is configured to randomize transmissions to the second group of mobile stations.

2. The base station of claim 1, wherein the base station is configured to transmit a data block comprising a fundamental channel, a downlink map, and a cooperator map.

3. The base station of claim 2, wherein the cooperator map comprises scheduling and modulation coding scheme information determined at the base station.

4. The base station of claim 2, wherein the base station communicates through time division duplexing.

5. The base station of claim 1, wherein the plurality of transmissions from the base station are centrally scheduled to serve the first group of mobile stations using cooperative relaying through a number of other relay stations.

6. The base station of claim 1, wherein the base station is configured to communicate with the plurality of mobile stations using a centralized scheduling scheme and a distributed scheduling scheme and wherein the base station is further configured to communicate directly with the plurality of mobile stations.

7. The base station of claim 1, wherein the base station is configured to serve the first group cooperatively by sending packets to the first group of mobile stations from the base station and the first relay station.

8. The base station of claim 7, wherein distributed scheduling means that the second relay node schedules resources for the second group of mobile stations.

* * * * *